United States Patent [19]
Kronk

[11] 3,906,469
[45] Sept. 16, 1975

[54] MAGNETIC-ELECTRIC POSITION SENSOR
[75] Inventor: Richard Eugene Kronk, Granby, Conn.
[73] Assignee: Combustion Engineering, Inc., Windsor, Conn.
[22] Filed: June 12, 1973
[21] Appl. No.: 369,325

[52] U.S. Cl............ 340/188 R; 176/19 R; 335/162
[51] Int. Cl............................................ G08c 19/04
[58] Field of Search...... 340/188 R; 176/19 R, 36 R

[56] References Cited
UNITED STATES PATENTS
3,217,307  11/1965  Fogelquist..................... 340/188 R Primary Examiner—Thomas B. Habecker

[57] ABSTRACT

Magnetic-electric position sensing apparatus is provided for sensing and indicating the position of a movable member. The apparatus comprises a magnet field generating assembly carried by and moving with the movable member and a plurality of magnetic flux responsive switches sequentially positioned along and parallel the path of travel of the field generating assembly. The magnetic field generating assembly comprises one or more magnets arranged to provide a magnetic flux pattern, which is substantially unaffected in its switch-actuating properties for variations of magnet-to-switch spacing within a limited range.

13 Claims, 9 Drawing Figures

PRIOR ART

MAGNETIC-ELECTRIC POSITION SENSOR

BACKGROUND OF THE INVENTION

The present invention relates to position sensing means and more particularly, to a magnetic position sensor. More particularly still, the invention relates to the relatively movable combination of magnetic field providing means and magnetically responsive electrical signal providing means, one part normally being stationary and the other movable.

The invention finds particular utility in monitoring the longitudinal position of some entity which is movable in the longitudinal direction, but which also may move transversely somewhat. Further, it is useful in an environment in which the moving member is completely physically isolated from the electrical signal developing means. While not limited thereto in its utility, the present invention is particularly well suited to the monitoring of the position of a control rod in a nuclear reactor.

As is well known in the case of a nuclear reactor, portions of the structure are normally isolated and sealed off to contain radioactive fluids at high operating temperatures and pressures. Accordingly, the positioning of elements such as control rods must be done from a remote location. Complicating matters is the fact that the control rods are positioned within sealed housings. It is preferable that position indicating means require little or no penetration of the housing as would be necessary for the parts of more conventional position indicating means. However, it is essential that the position of the moving member, in this instance a control rod, be monitored and known with a fairly high degree of accuracy.

The prior art for these environments has generally relied upon a position sensing and transmitting apparatus which affixes a magnet to a member which moves in accordance with the condition to be sensed. The magnet actuates flux responsive devices, such as reed switches, that are sequentially positioned in fixed locations along the path of motion of the magnet, spaced and separated therefrom, as by a nonmagnetic sealing housing. Examples of these general arrangements are seen in U.S. Pat. No. 3,594,740 issued July 20, 1971 to J. H. Comeau and W. Zinn; U.S. Pat. No. 3,656,074 issued April 11, 1972 to F. Bevilacqua and H. A. Runde; and U.S. Pat. No. 3,200,645 issued Aug. 17, 1965 to D. B. Levins. The last mentioned patent, while not in the nuclear environment, is confronted with the same general problems and utilizes similar prior art means to provide an indication of liquid level in a tank.

In these examples, particularly those relating to the position determining means for a control rod in a nuclear reactor, it may be important to establish the position of the movable member with a high degree of accuracy and reliability. Some nuclear control rod drives are of a type which move the rod in a series of small discrete steps whereas others may move the rod in a continuous manner. For either type of motion it is desirable to know, as accurately as possible, the position of the control rod in the reactor. The prior art control rod position indicators typified by the Comeau and the Bevilacqua patents cited above would provide an indication which would be accurate only to within ±6 inches of the actual position of the control rod. However, for reasons of safety, economy and control, it is desirable that the position of the rod be known to within ±2 – 2½ inches of its actual position.

To a small extent, the prior art system accuracy could be improved by closer sequential positioning of the flux responsive devices, however, the major cause of the wide range of inaccuracy was due to the fact that, for any particular longitudinal position of the control rod, the magnet might actuate a varying number of the flux responsive devices. This was due to the fact that the magnet was capable of some lateral wobble or movement relative to the flux responsive switches and this varied the nature and intensity of the magnetic field at the switches sufficiently to vary or alter the number of switches actuated, depending on the momentary spacing of the magnet therefrom.

The wobble, or variability of lateral spacing, is generally occasioned by a need for clearance between the moving member and the housing separating it from the flux responsive switches, in order to allow freedom of longitudinal motion. This is particularly true in the case of a nuclear control rod which must be capable of rapid insertion into the core in a fluid medium in case of a reactor scram. Therefore, it is not feasible to install means for restricting or preventing this lateral motion because such means might impede the necessarily rapid insertion.

SUMMARY OF THE INVENTION

In accordance with the present invention, means are provided which enable the position of a movable member to be determined, using magnetic field producing means and a plurality of flux responsive devices, with considerably greater accuracy than was heretofore possible. The magnetic field producing means carried by the relatively longitudinally movable member, which may also be limitedly movable laterally is such that it provides a magnetic flux pattern which will effect the same response from the flux responsive devices at a particular longitudinal positioning for any lateral movement or displacement thereof within the aforementioned limited range.

According to the invention, there is provided a magnetic-electrical position sensor which includes: first and second members spaced from one another and along a path substantially parallel the two members, the spacing between the members being variable within a limited range; electrical signal providing means which include a plurality of magnetic flux responsive devices, such as reed switches, positioned in succession along the first member in the direction of the relative longitudinal motion, the flux responsive devices each being responsive to a certain or particular magnetic flux and operative to provide a signal indicative of that certain or particular flux being interactive therewith; and magnetic field providing means supported by the second member and spaced from the flux responsive devices proportional to the spacing between the first and second members for providing a magnetic field of a shape and intensity which applies said particular or certain flux only to a particular number of the flux responsive devices at any particular position along the path of relative longitudinal motion for all spacings within the limited range of spacings.

In one embodiment, the requisite magnetic field is provided by two magnets longitudinally aligned and in magnetic opposition (repelling) with one another. A spacer may extend between these two magnets and be of a ferromagnetic material having a higher level of flux saturation than the magnets themselves.

Alternately, or in addition to, the magnet arrangement mentioned above, pole pieces of ferromagnetic material having a high flux saturation level may be added to the magnet or magnets at opposite ends thereof.

DESCRIPTION OF THE PREFERRED EMBODIMENT

Figures 1, 2:
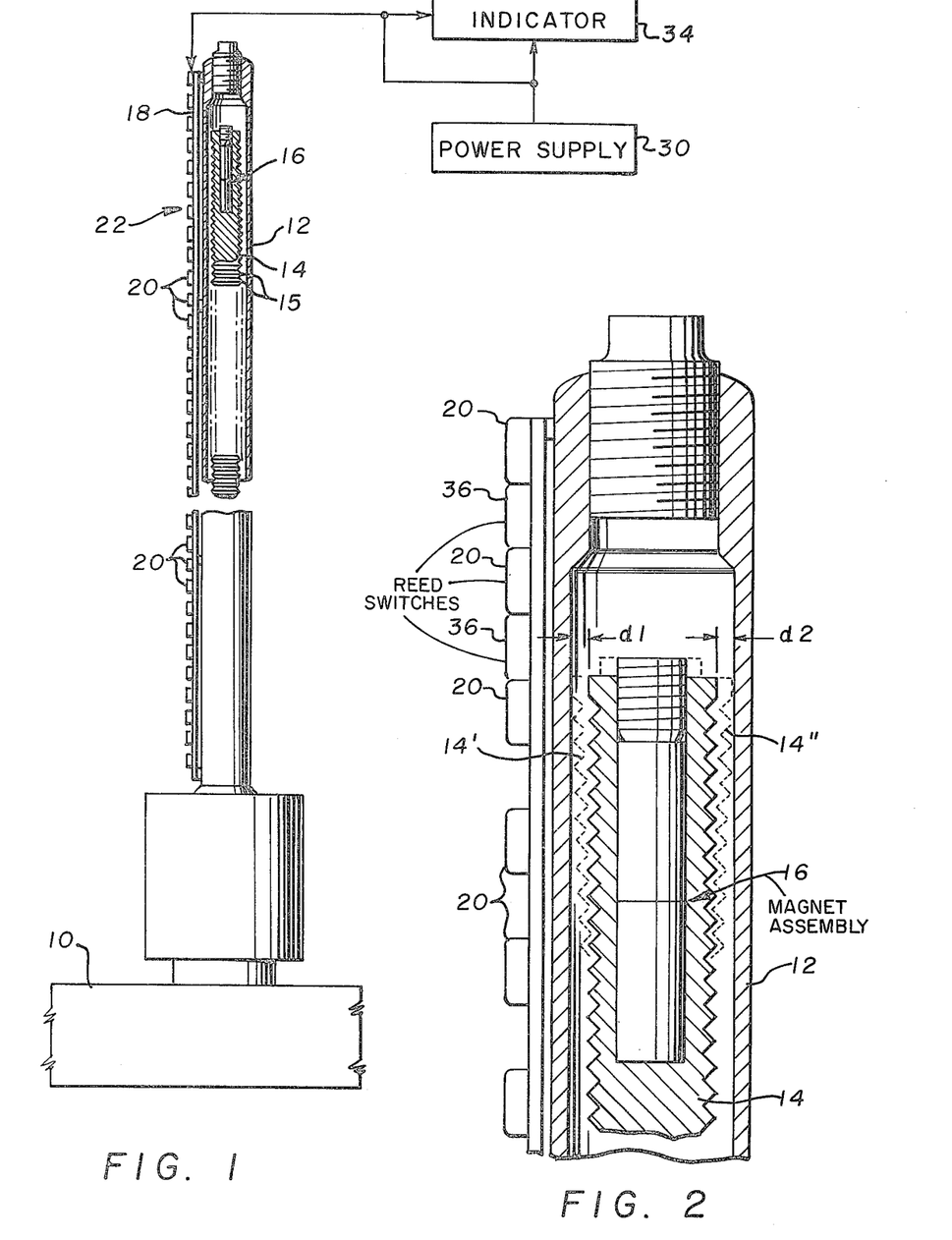
FIG. 1 depicts the position indicator of the invention in use on a nuclear reactor.
FIG. 2 is an enlarged view of a portion of FIG. 1 showing the control rod housing and magnetic field generating assembly in greater detail.

Referring now to FIG. 1, there is depicted a portion of a nuclear reactor 10. Extending upwardly from the top of reactor 10 are a plurality of control rod housings, only one of which is shown generally at 12. Control rod housing 12 will typically be a nonmagnetic stainless steel tube-like structure which may be of different diameters at different points along its length. In the region proximate reactor 10, housing 12 may be enlarged to contain part of a magnetic jack mechanism therewithin, with the electromagnets therefore being disposed about the outer perimeter. It will be appreciated that various other control rod actuating means might be employed, alternatively. Along the region of housing 12 upward of the magnetic jack mechanism, the housing is circular and of substantially uniform inside and outside diameter, the former being about 2 inches and the latter 2½ inches. In the case where reactor 10 is employed for heating water in an electrical power generating application, housing 12 will be filled with water and the temperature within the housing may be 500°F or more.

A control rod, not shown here, is adapted to be reciprocably inserted into and withdrawn from the reactor core. The control rod will typically be 12–15 feet in length, requiring a stroke of comparable length. A control rod drive extension 14 firmly engages the control rod and extends upward therefrom within the reactor 10 above the core and within housing 12. Drive extension 14 will typically be somewhat longer than the control rod, or about 13–16 feet, and it is coaxially housing and is vertically reciprocably movable within housing 12. The drive extension 14 includes teeth 15 along its length and grippers associated with the magnetic jack engage the teeth to move drive extension 14 and the control rod in ¾ inch vertical steps.

Drive extension 14 is of nonmagnetic stainless steel and is generally circular in cross section having an outer diameter of about 1¾ inches. This geometry normally allows a uniform radial spacing of five-sixteenth inch between the extension 14 and the inner wall of housing 12, as designated by arrows $d_1$ and $d_2$ in FIG. 2, when the extension is exactly centered with the housing. Spacing $d_1$ and $d_2$ is desirable to insure that extension 14 is freely movable, longitudinally, in housing 12, particularly during a scram when rapid insertion in a liquid or fluid medium is required.

To provide an indication of the actual, or nearly actual, position of the control rod within the reactor 10 relative to the core, magnetic-electrical position sensing means of a type generally, but not specifically, similar to that of the aforementioned Bevilacqua patent are employed. Generally, magnetic field providing means are carried by the drive extension 14 and serve to actuate flux responsive electrical signal providing means positioned vertically along and adjacent to housing 12 externally thereof. The magnetic field providing means are generally positioned at or near the upper end of the drive extension such that its spatial relationship with the flux responsive means is not interfered with by the change in geometry of housing 12 or by the electromagnetic fields at the jacking mechanism.

Normally extension 14 will be centered or coaxial with housing 12, as established by engagement with the grippers of the magnetic jack. However, the vertical distance between this radial support point and the upper end of extension 14 may be as much as 10–12 feet when the rod and drive extension are raised or withdrawn. Because there is no significant lateral or radial support to the extension 14 near its upper end when raised, or partially raised, it may move or wobble laterally. The amplitude of this lateral movement or wobble may be quite significant and, in the embodiment described, is limited by contact of extension 14 with the inner wall of housing 12, as depicted in phantom in FIG. 2. Phantom extension 14' depicts the condition of minimum lateral switch-to-magnet spacing and phantom extension 14'' depicts the condition of maximum lateral switch-to-magnet spacing. This amplitude of lateral movement for the upper region of extension 14 might be anticipated any time the control rod is raised more than several feet above its lowered or fully inserted limit. In the arrangement being described, the peak-to-peak amplitude of this lateral displacement or wobble may be as great as $d_1$ plus $d_2$, or about ⅝ inch. This lateral motion may accompany and follow longitudinal stepping of the control rod or it might be induced by various vibratory forces present in the system independent of the actual stepping of the particular control rod. It is this variable spacing of extension 14 from flux responsive means fixedly positioned relative to housing 12 which creates the problem dealt with by the invention.

A magnetic field generating assembly 16, in accordance with the invention and to be described in detail below, is immovably housed within a cavity, such as a downward bore, in the upper end region of extension 14. Typically, a downward bore exists in the upper end of extension 14 coaxial therewith to serve as a container for magnetic assembly 16 and a nonmagnetic plug sealingly closes the upper end of the bore and urges the assembly against the bottom of the bore.

The means for providing electrical indicating signals in response to the longitudinal position of magnet assembly 16, and thus the control rod, are similar in most respects to those described in the aforementioned Bevilacqua patent. A nonmagnetic mounting strip or board 18 is adapted to extend vertically parallel housing 12 and extension 14, externally of the housing. Strip 18 is at least coextensive with, and preferably somewhat longer than, the full vertical stroke length of extension 14. It may be fixedly positioned relative to housing 12 closely adjacent thereto, as by securing it directly to the housing or fixedly positioning it within a nonmagnetic housing, not shown, which is in turn affixed to housing 12.

A plurality of flux responsive devices, such as reed switches 20, are fixedly mounted on strip 18. Reed switches 20 are reed relays which consist of two reeds of magnetic material sealed in opposite ends of a glass tube in such a way that the reeds overlap at the center of the tube with a small gap. When subjected to a magnetic field in which the flux extends axially, or parallel, the reeds of the switches 20 and is above some threshold value in intensity, the reeds come together, thereby closing a circuit. So long as this magnetic field is applied to or interacts with a switch 20, it remains closed. Because a switch exhibits some hysteresis, it may remain closed until the intensity of the flux interacting with it decreases some 20 percent below the threshold level.

Switches 20 are aligned in vertical end-to-end relationship in one, or preferably two side-by-side rows which extend from the lower limit of travel of magnet assembly 16 to the upper limit of its travel because the magnetic field assembly 16 is within housing 12 and switches 20 are outside it, the center line extending longitudinally through each switch is spaced laterally from the center line extending longitudinally through magnet assembly 16. Typically, the switches 20 will be 1 inch in length and are displaced on 1½ inch centers vertically. The two row configuration places a pair of switches 20 beside one another at the same longitudinal or vertical positioning for each elevation of switches. Both switches at an elevation are equidistant from housing 12, and approximately equidistant from magnet assembly 16, and are connected electrically in series with each other in a circuit to be described.

The switches 20 serve as fixedly positioned, multipoint contact wipers of an incremental potentiometer 22 which also includes a plurality of impedance elements, such as resistors 24, mounted on strip 18 but not shown in FIGS. 1 and 2. Resistors 24 are all of the same value. The potentiometer or voltage divider 22 is formed by connecting the resistors 24 in a series string and connecting the end points 26 and 28 of the series string across a power supply 30 which may be located remotely from the resistors 24 and mounting strip 18.

Figure 3:
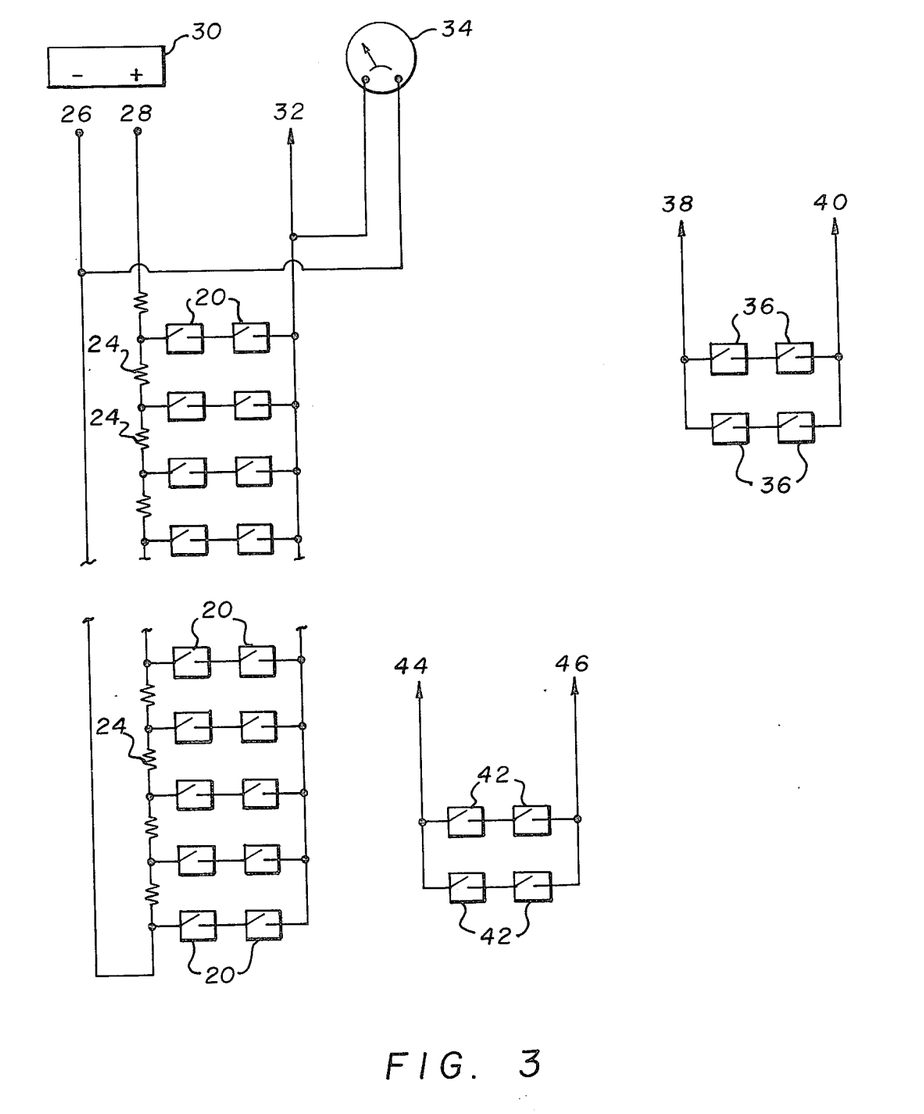
FIG. 3 is a schematic diagram of the electrical circuitry of a flux responsive incremental potentiometer used in the invention.

As seen schematically in FIG. 3, one end or terminal of the series pair of reed switches 20 at an elevation is connected to the junction of a pair of resistors 24. Each successive elevation of reed switches 20 is similarly connected to the next successive junction of a pair of resistors 24 in the series string. At one or both ends of the vertical succession of reed switches 20, the pair of switches may connect directly to an end terminal 26 and/or 28 of the incremental potentiometer 22, rather than to a junction of two resistors. This requires essentially the same number of resistors 24 as pairs of switches 20, give or take one or two.

The other end or terminal of every series pair of reed switches 20 at the various elevations is connected to a common conductor or bus 32 which serves as the collecting wiper for potentiometer 22 and may be connected to a remotely located indicator 34, which is capable of displaying the voltage on wiper bus 32 and may be calibrated in units of length, such as inches.

Switches 20 are arranged in pairs at each elevation in order to insure continued operability of the potentiometer 22, even if one of the switches at an elevation should fail to the closed condition.

Additionally, two pairs of reed switches 36 may be mounted on strip 18 near the upper limit of travel of magnet assembly 16 to provide an indication that the magnet assembly, and accordingly the control rod, is at or near its upper limit of travel. One pair of series switches 36 is vertically spaced an inch or two from the other and the two pairs are connected electrically in parallel. The end of terminals 38 and 40 of the pair of switches 36 are connected to remote indicating means, not shown. Similarly, another two pairs of reed switches 42, with one pair electrically parallel the other and vertically spaced an inch or two, are mounted on strip 18 near the lower limit of travel of the magnet assembly 16 to provide an indication of lower travel limit. The end terminals 44 and 46 of series connected switches 42 are similarly connected to remote indicating means, not shown. The vertically spaced switch pairs, 36 or 42, provide limit zone signals, which for the case of opposed magnets, are not interrupted by the positioning of a given switch pair opposite the center of the magnet assembly.

Figure 4A:
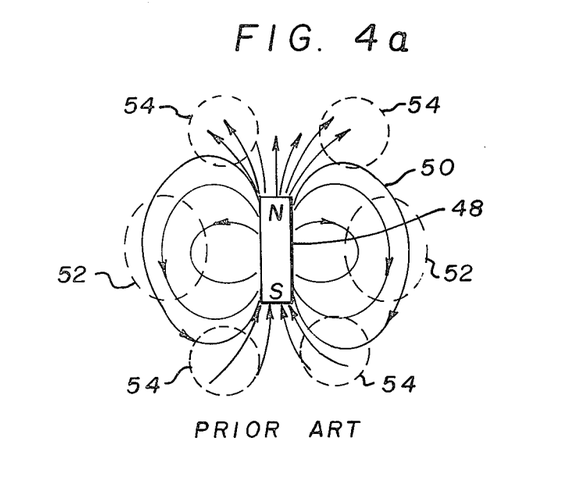
FIG. 4a is a pictorial representation of a prior art magnet and its flux pattern.

Attention will now be directed to the novel structure of magnet assembly 16 and a comparison with the prior art. Referring to FIG. 4a there is shown the magnetic field generating assembly of the typical prior art position indicator, as exemplified by the aforementioned patents to Comeau, Bevilacqua and Levins. This arrangement generally included a bar type permanent magnet 48 that was vertically oriented with one pole above the other, or parallel the vertical axis and reeds of the reed switches spaced therefrom. Magnet 48 generated a magnetic field defined pictorially by flux lines 50. This field pattern follows a classic form and is generally symmetrical around the centerline of the magnet, particularly if it is cylindrical. It has a return path along the length of the magnet and spaced laterally from it which provides the requisite axially directed flux in region 52, which interacts with a reed switch to actuate it closed. However there also appears magnetic flux having an axially directed component which exists in regions 54 beyond the ends of magnet 48 and which may be of sufficient intensity laterally of the magnet to also actuate reed switches thereat.

Figure 4B:
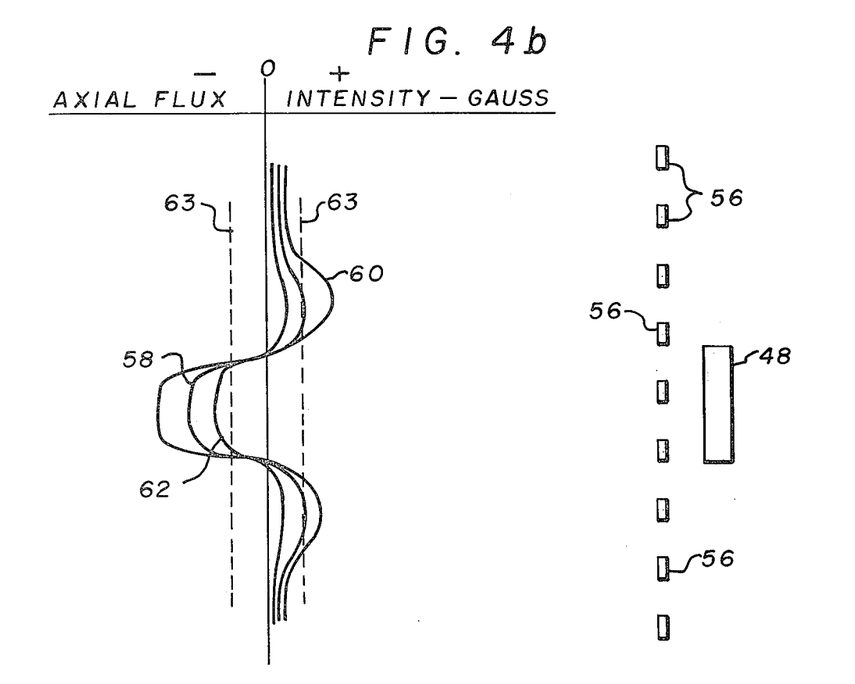
FIG. 4b is a plot of the axial flux intensity, at the switches, for the prior art magnet and various switch-to-magnet lateral spacings.

FIG. 4b depicts, graphically and diagrammatically, the intensity of axially directed magnetic flux from prior art magnet 48 as viewed at and along a series of several reed switches 56 in a prior art potentiometer in the regions of the magnet. As used herein, the expressions "axially directed flux intensity" or "axial flux intensity" refer to the magnetic flux density on a planer area in which the plane extends transversely or laterally of the longitudinal or axial extent of the magnet or magnets. Stated another way, it refers to the density of the axially directed component of magnetic flux. Three different traces 58, 60, 62 of the axial flux intensity are presented on the same scale or graph, trace 58 being the intensity when the lateral spacing between magnet 48 and switches 56 corresponds to a centered position of magnet 48 relative to housing 12, trace 60 corresponding to the intensity when that spacing is a minimum as when extension 14 laterally contacts housing 12 near the reed switches, and trace 62 corresponding to the intensity when that spacing is a maximum as when extension 14 laterally contacts housing 12 remote from the reed switches. The relative longitudinal or axial relationship of the magnet 48 to the several switches 56 and to the graph is provided by their positionings in the combination of magnet and switches in the righthand side of the figure.

The dotted lines 63 on opposite sides of the zero axial flux intensity line and equidistant therefrom represent a level of axial flux intensity at which the reed switch will be actuated from its normally open state to a closed state. Somewhat closer to the zero intensity base would be another threshold, not shown here, which would represent the axial flux intensity below which a closed switch would return to the normally open state.

An analysis of FIG. 4b reveals that, for a particular longitudinal relationship of prior art magnet 48 and switches 56, the number of switches actuated closed would depend in large measure on the lateral positioning of the magnet relative to the switches. As had been earlier mentioned, this positioning or spacing might vary by an amount greater than one-half inch, with the results evident from the graph of FIG. 4b. Those reed switches extending in that part of the axial flux pattern which is substantially coextensive with the magnet and of a shape having a steep slope between the intensity levels above and below the actuation threshold for the full magnet-to-switch spacing range will be constantly actuated for any spacing in the range. However, the switches extending beyond the ends of the magnet are in regions where the flux intensity may vary above or below the threshold level, depending on the spacing. This latter situation gives rise to ambiguity or uncertainty as the spacing cannot be accurately known or controlled, and the switch actuation pattern and resulting electrical indication from the potentiometer may indicate a longitudinal positioning of the magnet and its control rod which is inaccurate by the spacing between several switches. In a prior art system in which the reed switch longitudinal spacing was 2 inches on centers, the number of switches actuated at a given longitudinal positioning of the magnet was seen to vary between one and four switches for a lateral spacing variation of 0.65 inch, resulting in an accuracy that was no better than ±6 inches.

A magnetic field providing assembly 16 of the invention has improved this accuracy to within ±2 inches of the actual longitudinal positioning of the assembly and extension 14. According to the invention, reed switches 20 are now spaced on 1½ inch centers; however, the improvement resides principally in providing a magnetic field which will actuate a particular number of reed switches 20 at a particular relative longitudinal positioning and that number of switches actuated at that positioning will be substantially constant and independent of the lateral spacing occasioned by the physical system.

Figure 5A:
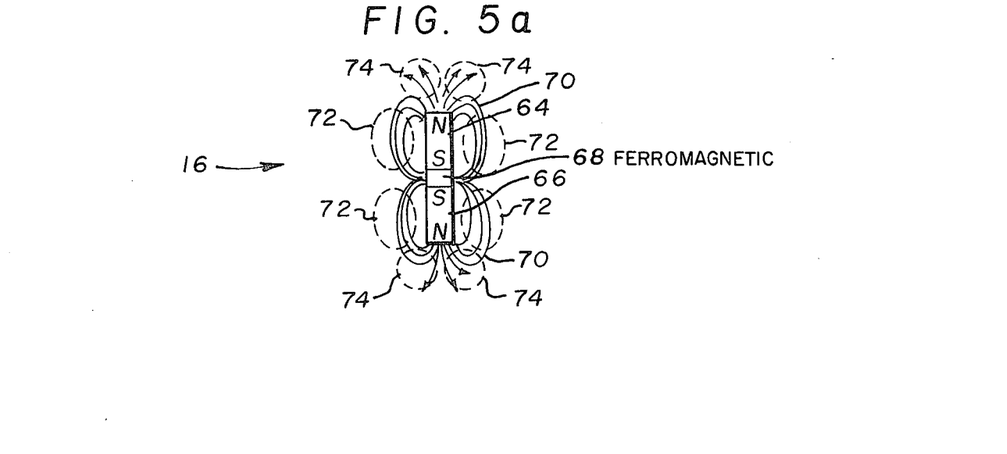
FIG. 5a is a pictorial representation of the magnet assembly and its flux pattern according to one embodiment of the invention.

In a preferred embodiment, assembly 16 preferably comprises a pair of magnets, such as cylindrical Alnico V permanent magnets 64 and 66, disposed in axially aligned magnetically opposed or repelling relationship with one another, as seen in FIG. 5a. Typically, magnets 64 and 66 will each be 2 inches in length, have a diameter of five-eights inch, and will be snugly housed in a sealed bore or chamber near the upper end of extension 14. The magnets 64 and 66 will be vertically oriented to parallel the direction of travel of extension 14, with a pair of similar poles, North or South, at the vertical end extremes of the assembly 16, and the other similar pair of poles, South or North, proximate one another at or near the middle of the assembly.

Further improvement may result if a spacer 68 is positioned axially between and in contact with the adjacent ends of the pair of magnets 64 and 66. Spacer 68 may be a ⅝ inch diameter cylinder having a length of about one-half inch and consisting of a material having a high relative magnetic permeability or flux saturation level, as for instance, a ferromagnetic substance such as C1018 mild steel. Spacer 68 both enhances the pattern of the magnetic field and, it is thought, reduced mutual demagnetization and preserves the strength of magnets 64 and 66 which are in opposition.

Figure 5B:
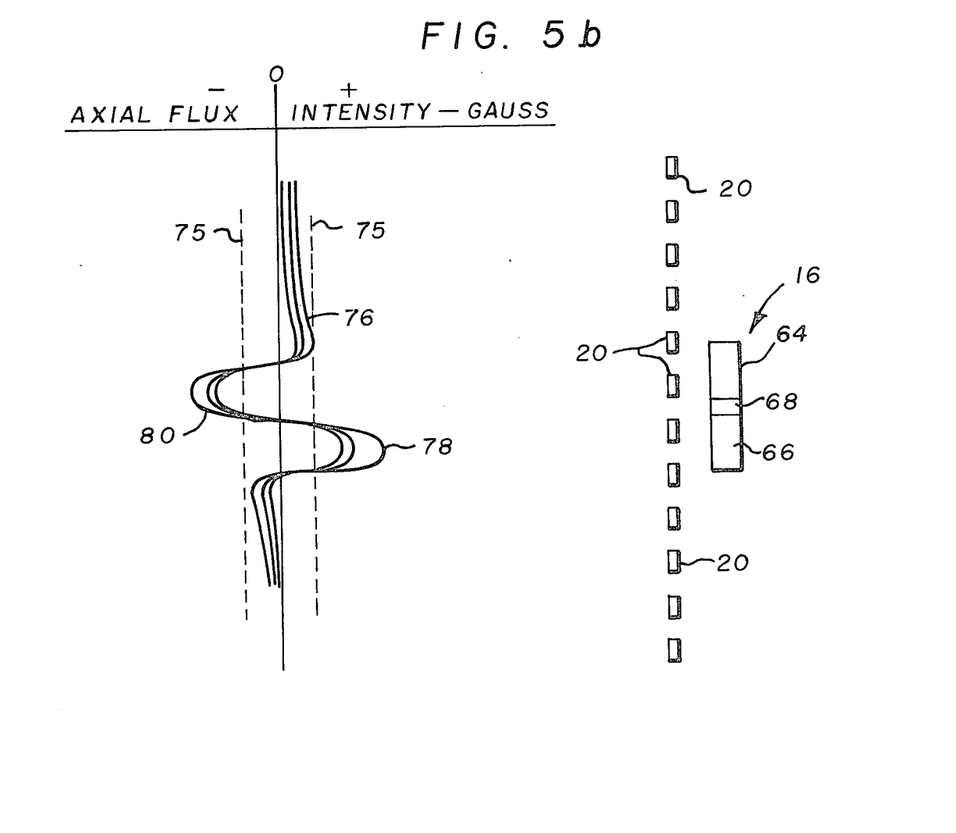
FIG. 5b is a plot of the axial flux intensity, at the switches, for the FIG. 5a magnet assembly at various lateral switch-to-magnet spacings.

Referring further to FIG. 5a, the magnetic field pattern of assembly 16 comprising magnets 64 and 66 and spacer 68 is depicted in a manner similar to FIG. 4a. Flux lines 70 are axially directed, though in 180° opposition, along part of the length of the assembly 16, in regions 72. However, the intensity of the axially directed field beyond the ends of assembly 16, particularly laterally thereof, is significantly reduced as seen in FIG. 5b. FIG. 5b is similar to FIG. 4b, with the potentiometer 22 including somewhat more closely spaced reed switches 20 and with the novel magnetic field generating assembly of a preferred embodiment of the invention.

It will be noted in FIG. 5b that the axially directed component of magnetic flux decreases sharply from a relatively high intensity, greater than the actuation threshold value for the switches, indicated by dotted lines 75, to zero flux intensity and reverses direction and increases sharply in the opposite direction to a value above the switch threshold for movement along the assembly 16 at its midregion. The axial component of flux intensity remains above the switch threshold value within the range of switch-to-magnet spacings mentioned earlier, as one moves longitudinally away from the midregion of assembly 16 and to the ends, where it again sharply declines to zero.

Longitudinally beyond the ends of assembly 16, the axial flux direction again reverses but, most importantly, remains at a very low level of intensity. The level of axial flux intensity beyond the ends of assembly 16 is sufficiently low that the actuation threshold of the switches 20 will not be exceeded for the range of anticipated magnet-to-switch spacings, while the intensity generally varies inversely as the square of the distance from a point source, this inverse square law does not necessarily follow close to a magnet of some length and width, particularly where the directional sense of the flux is concerned, axial flux trace 76 being that where the lateral spacing between magnet assembly 16 and switches 20 corresponds to a centered position of the assembly within housing 12; trace 78 corresponds to the intensity when the spacing is a minimum as when extension 14 contacts the housing near the switches; and trace 80 corresponds to the intensity when the spacing is a maximum as when the extension 14 contacts the housing remote from the switches.

It will be noted from the graph of FIG. 5b that there is a region at and near the midpoint of magnet assembly 16 along which the axially directed flux is below the actuation threshold. When a switch 20 is laterally adjacent this region it will not be actuated closed, or rather it will have been actuated closed and will open when arriving adjacent that region. The switch will be reclosed when it continues to move longitudinally relative to the magnet assembly and enters the high flux region of the next magnet in the assembly. While a switch 20 is in this low axial flow midregion and is open, at least one switch above it and one below it will be actuated closed by the vertically spaced fields of the vertically spaced magnets 64 and 66. With this configuration of switch actuation on potentiometer 22, the electrical signal resulting on bus 32 is the same as if the open, middle switch had been closed.

If the magnet assembly 16 is to pass longitudinally or vertically sufficiently beyond those switches 20 shown at the end ranges of the potentiometer 22 such that these end switches might be centered in the nonactuating midregion of the assembly, it may be necessary to add an additional switch or two, not shown, vertically beyond and electrically parallel end switches depicted to insure that the electrical signal provided by closure of the end switches is obtained by closing the additional switch.

The longitudinal lengths and spacings of the axial flux fields and reed switches is such that at least two, generally three and sometimes four switches are actuated closed at various relative longitudinal positionings, with only one of these configurations occurring at a particular relative longitudinal positioning if approaching it from a particular vertical direction. If the longitudinal positioning is approached from the other vertical direction, only one such configuration of switch actuation will occur at each position; however at the same longitudinal position as approached from the other direction, the number of switches may differ due to the drop-out hysteresis. This is not a significant problem, as the variation in particular switches actuated at a particular longitudinal positioning of the magnet as a function of approach direction is generally only one switch and it is immediately adjacent the switch or switches actuated in common at that position. Because of the large number of increments, about 96, on the potentiometer and the small total number of switches actuated and the close spacing of reed switches 20, a difference in the actuation patterns at a longitudinal positioning, which differs only by one adjacent switch, introduces only a small margin of error. In fact, for the more common case there is no error, since when the magnet approaches the selected position from one direction, three adjacent switches are found actuated when the position is reached. When approaching from the opposite direction, the center one of the three switches is deactuated and the end two switches of the three are actuated. The electrical signals at bus 32 are identical for these two cases.

As used in conjunction with a drive extension 14 which is moved in ¾ inch vertical increments, the magnet assembly 16 incorporating magnets 64 and 66 and the potentiometer 22 using switches 20 on 1½ inch centers provide an output signal which is indicative of the control rod position within a ±3 step accuracy, regardless of lateral spacing of the magnet assembly within housing 12. The prior art systems were accurate only to within ±8 such steps.

The placement of magnets 64 and 66 in opposition is seen to greatly reduce the axially directed flux beyond the ends of assembly 16 laterally outward thereof as mentioned. The fact that the magnets are in opposition at the midregion of assembly 16 serves to provide a sharp transition in flux direction in that region. The spacer 68, which is optional though preferred, seems to further increase the laterally or radially directed flux and decrease the axially directed flux in the region between magnets 64 and 66. This tends to enhance the sharp transition between axially and laterally directed flux at the midregion and to longitudinally extend the midregion between magnets 64 and 66 at which there is little or no axially directed flux.

Figure 6A:
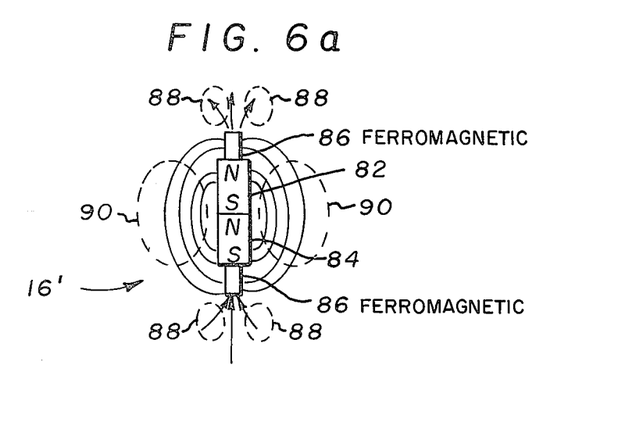
FIG. 6a is a pictorial representation of the magnet assembly and its flux pattern according to another embodiment of the invention.
Figure 6B:
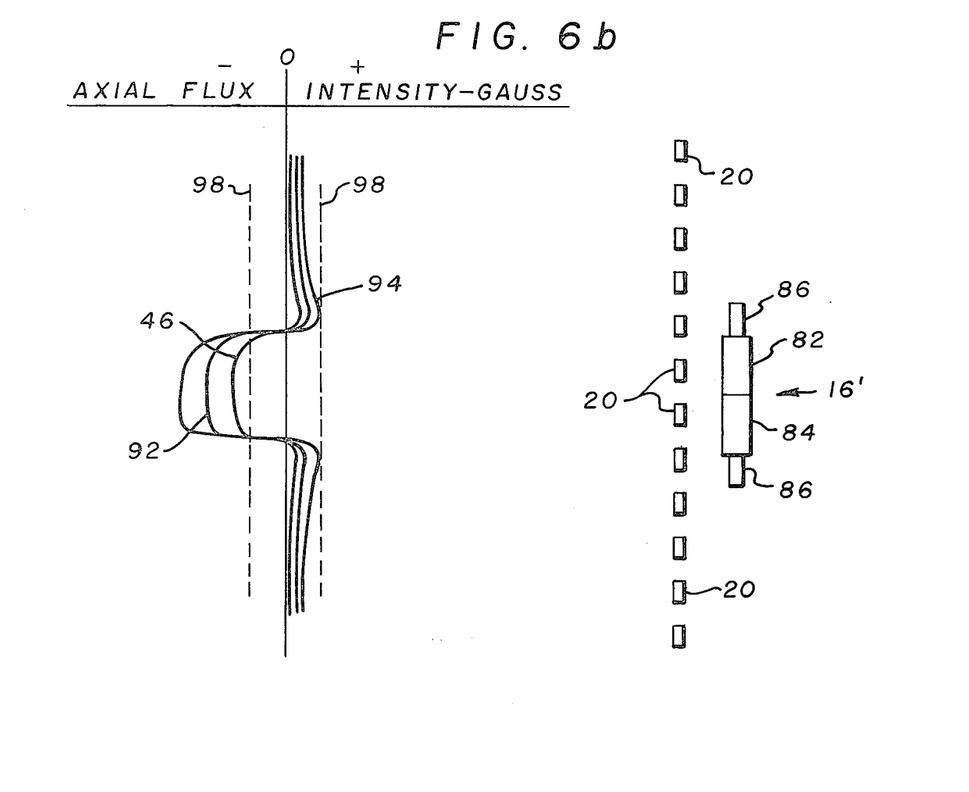
FIG. 6b is a plot of the axial flux intensity, at the switches, for the FIG. 6a magnet assembly at various lateral switch-to-magnet spacings.

FIGS. 6a and 6b depict an alternate embodiment of magnet assembly 16, designated 16' therein, which is functionally similar to the assembly 16 in that it provides a magnetic field having axially directed flux above the switch 20 threshold intensity for only a certain number of switches at any particular relative longitudinal positioning between the switches and the magnet assembly, regardless of the lateral switch-to-magnet spacing within the range defined by housing 12. Assembly 16' includes a pair of vertically extending and aligned permanent cylindrical bar type magnets 82 and 84 in series and having a pair of pole pieces 86 at the opposite ends of the series of magnets. Magnets 82 and 84 are permanent Alnico V magnets, ⅝ inch diameter and 2 inches each in length. Magnets 82 and 84 in the series aiding configuration might be replaced with a single magnet having the same overall length.

Pole pieces 86 are of a material which is similar to or the same as that used in spacer 68 of the preceding embodiment in that it is ferromagnetic and has a high relative magnetic permeability and flux saturation level. Pole pieces 86 are preferably each cylindrical and of a similar or smaller diameter than magnets 82 and 84 and may each be 1–2 inches in length. Pole pieces 86 are both vertically extending and in contacting alignment with, respectively, the upper end of magnet 82 and the lower end of magnet 84. Pole pieces 86 act to increase or concentrate the flux density in the region of their use and this appears to decrease the intensity or density of the axially directed flux beyond the ends and laterally outward of magnets 82 and 84, as seen in FIGS. 6a and 6b. That axially directed flux seen in regions 54 of FIG. 4a is greatly diminished, or rather has a different directional attitude, in the comparable region 88 in FIG. 4a. The axially or longitudinally directed flux along the lengths of and spaced from magnets 82 and 84 in regions 90 is generally similar to the pattern depicted in region 52 of FIG. 4a when a single magnet is used or may be somewhat more uniform at the switches along the length of magnets 82 and 84 when the two magnets are used. The very small air gap between the magnets "flattens" the flux in that region, as seen in FIG. 6a.

Referring to FIG. 6b, there is presented a graphic plot of the axially directed magnet flux intensity provided by magnetic field generating assembly 16' as viewed at and along a series of switches 20 extending longitudinally of the assembly and spaced laterally therefrom each of the aforedescribed switch-to-magnet lateral spacings. Trace 92 represents the axial flux intensity for a magnet-to-switch spacing which corresponds with the radially centered position of assembly 16' and extension 14 relative to housing 12. Trace 94 represents the axial flux intensity for a spacing corresponding to the extension 14 contacting housing 12 near switches 20. Trace 96 represents the axial flux intensity for a spacing corresponding to the extension 14 contacting housing 12 remote from switches 20. The switches are actuated to the closed state when the axial flux intensity exceeds the threshold value indicated by dotted line 98.

As was evidenced in the flux plot in FIG. 5b for the initial embodiment of the invention, the intensity of axially directed flux beyond the ends of magnets 82 and 84 and laterally spaced therefrom is sufficiently attenuated that it remains below the switch actuation threshold for the full range of lateral switch-to-magnet spacings possible in the described embodiment. The transition from radially directed flux to axially directed flux is rapid or sharp near the ends of the magnets 82 and 84 such as to avoid varying switch actuation as a function of switch-to-magnet spacing along the lengths of the magnets. The longitudinal extent of the axially directed flux above the threshold is sufficient to always maintain two, and usually three, switches 20 actuated closed.

It will be appreciated that the above-described invention is not limited in use to application with nuclear control rods, but rather is particularly advantageous in any position indicating function which requires the moving element to be physically isolated from the electrical indicating means and further allows some degree of lateral motion between the relatively longitudinally movable magnet and flux responsive devices. An example might be the environment depicted and discussed in the aforementioned Levins patent. Further, for certain positioning or position indicating functions, the reed switches might be replaced with other magnetic flux responsive means, such as Hall-effect devices, which might take advantage of the improved shape of the flux pattern to provide electrical indications which are independent of the limited variation in lateral spacing.

It may be further appreciated that one embodiment for the above described invention, the embodiment which uses opposed magnets and a preferred spacer as indicated in FIGS. 5a and 5b, exhibits a sharply defined null zone of axial flux which is adjacent to the center of the magnet assembly 16 and which is bounded above and below by very strong and laterally far reaching zones of axial flux. For remote position indicating, generally the null zone, being symmetric about the lateral centerline of the magnet assembly being sharply defined and being readily identifyable due to strong boundary flux at far reaching zones is a feature which extends the art for determining positions by noncontacting means.

It will be understood, therefore, that variations, changes in the details, materials, and arrangements of the parts which have been herein described and illustrated in order to explain the nature of the invention may be made by those skilled in the art within the principles and scope of the invention as expressed in the appended claims.

What is claimed is:

1. An electrical position sensor comprising:
   a. first and second members laterally spaced from one another and longitudinally movable relative to one another along a path substantially parallel said members in accordance with a condition to be sensed;
   b. electrical signal providing means including a plurality of magnetic flux responsive devices positioned in close succession along said first member in the direction of said relative longitudinal motion, each device responsive to a threshold magnetic flux of a particular intensity and extending axially thereof to provide a signal indicative of at least said threshold flux being interactive therewith;
   c. magnet means carried by said second member and spaced laterally from said flux responsive devices proportional to said spacing between said first and second members for providing a magnetic field having an axial flux along at least part of the length of and beyond the ends of said magnet means and laterally thereof at least the distance to said flux responsive means of sufficient intensity to provide said particular threshold flux; and
   d. flux controlling means carried by said second member and positioned near said magnet means for reducing said axial flux beyond the ends of said magnet means and at said lateral distance to said flux responsive means to an intensity less than said threshold value.

2. The apparatus of claim 1 wherein said flux responsive devices each comprise at least one reed switch having its axis substantially parallel said path of relative motion; said magnet means is oriented parallel said reed switch axis; and said flux controlling means comprise ferromagnetic pole pieces proximate the end poles of said magnet means.

3. The apparatus of claim 1 wherein the longitudinal center line of each said flux responsive device is laterally spaced from the longitudinal center line of said magnet means.

4. The apparatus of claim 1 wherein said first and second members are subject to variable lateral spacing relative to one another within a limited range and said flux controlling means reduce said axial flux beyond the ends of said magnet means to less than said threshold value for all lateral distances to said flux responsive means within said limited range of variable spacing.

5. The apparatus of claim 4 wherein said flux responsive devices each comprise at least one reed switch having its axis substantially parallel said path of relative motion; said magnet means is oriented parallel said reed switch axis; and said flux controlling means comprise ferromagnetic pole pieces proximate the end poles of said magnet means.

6. An electric position sensor comprising:
   a. first and second members longitudinally movable relative to one another along a path substantially parallel said members in accordance with a condition to be sensed;
   b. electrical signal providing means including a plurality of magnetic flux responsive electric devices fixedly positioned in succession along said first member in the direction of said relative longitudinal motion, each said flux responsive device operative to provide an electrical signal indicative of a certain magnetic flux interactive therewith; and c. a magnet assembly supported by said second member and spaced from said flux responsive devices, said assembly comprising two magnets arranged in magnetically opposing relationship and each having its respective poles spaced in the direction of said relative longitudinal movement, said assembly being sequentially positioned in juxtaposition with different said flux responsive devices by said relative movement and each said magnet providing said certain flux interactive with a said flux responsive device when laterally adjacent thereto.

7. The apparatus of claim 6 wherein said first and second members are spaced from one another a distance which is variable within a limited range, said magnet also being spaced from said flux responsive devices in proportion to said spacing between said first and second members, and said certain magnetic flux is interactive with only a particular number of said flux responsive devices at any particular position along said path of relative longitudinal movement for all spacings within said range.

8. The apparatus of claim 7 wherein said two magnets are longitudinal spaced from one another and include a ferromagnetic material extending therebetween having a higher flux saturation level than said magnets.

9. The apparatus of claim 7 wherein each said flux responsive device comprises a magnetically actuated switch, each said switch being actuated to a particular state in response to substantially the same said certain magnetic flux interacting therewith and said signal providing means additionally include means connected to said plurality of flux responsive devices for providing signals indicative of particular said switches being in said particular state of actuation.

10. The apparatus of claim 9 wherein said magnetically actuated switches are reed switches each oriented parallel said path of relative longitudinal movement and said two magnets are each permanent bar magnets having their poles longitudinally aligned and oriented parallel said path of relative longitudinal movement.

11. The apparatus of claim 10 wherein said reed switches are normally open and are actuated to the closed state by interaction with longitudinally directed magnetic flux of an intensity greater than a threshold value, said flux so directed and greater than said threshold value comprising said certain magnetic flux.

12. The apparatus of claim 11 wherein said particular number of reed switches actuated closed by said certain magnetic flux of said two magnets at any particular position along said path relative longitudinal movement is at least two.

13. The apparatus of claim 11 wherein said signal providing means include:
   a. a voltage source;
   b. means for generating a plurality of output voltages of different magnitude being connected across said voltage source; and
   c. means for applying individual of said plurality of output voltages to first terminals of individual of said reed switches and means connected to second terminals of each of said reed switches for providing a signal voltage passed by a closed reed switch to a readout device.

* * * * *